(No Model.)
J. KIDDER.
ROLL HAVING REMOVABLE JOURNALS.
No. 441,169.  Patented Nov. 25, 1890.
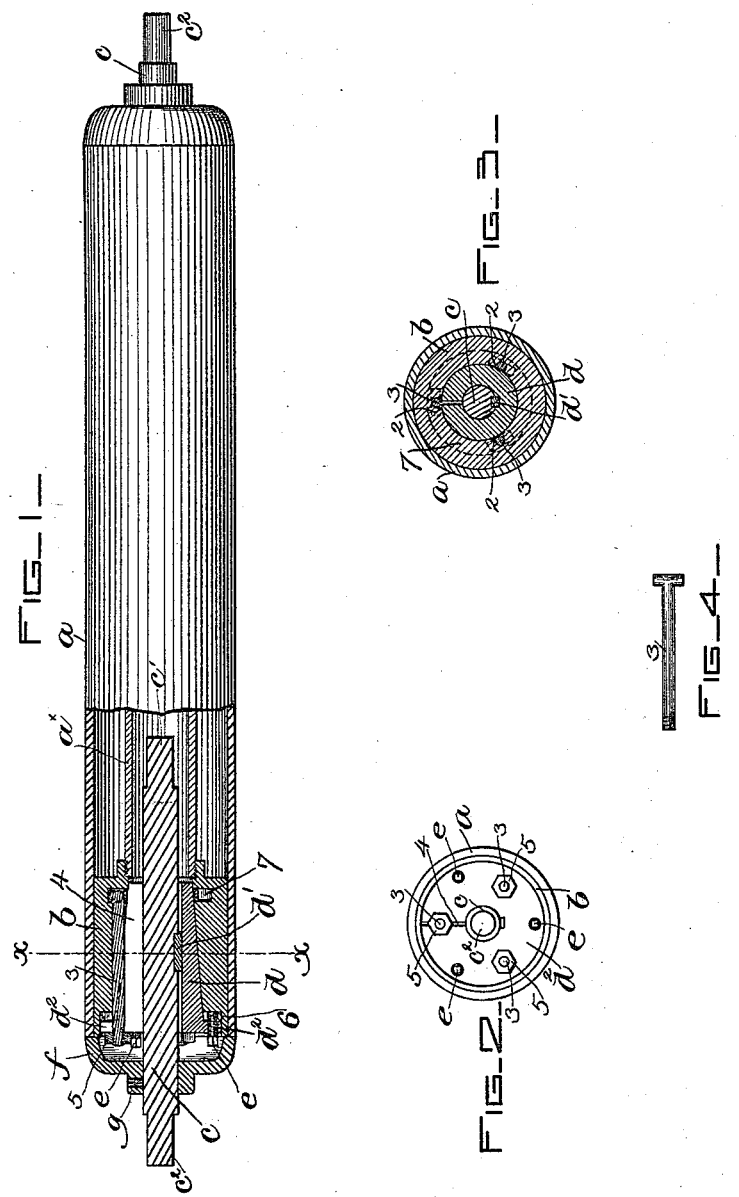
WITNESSES
INVENTOR
Jason Kidder,
by Crosby & Gregory
Attys

UNITED STATES PATENT OFFICE.

JASON KIDDER, OF FRANKLIN FALLS, NEW HAMPSHIRE.

ROLL HAVING REMOVABLE JOURNALS.

SPECIFICATION forming part of Letters Patent No. 441,169, dated November 25, 1890.

Application filed October 18, 1889. Serial No. 327,466. (No model.)

*To all whom it may concern:*

Be it known that I, JASON KIDDER, of Franklin Falls, county of Merrimac, State of New Hampshire, have invented an Improvement in Rolls having Removable Journals, of which the following description, in connection with the accompanying drawings, is a specification, like letters and figures on the drawings representing like parts.
In many classes of machines, and more especially in machines for the manufacture of paper where a great number of rolls having journals are employed, as in connection with Fourdrinier aprons, calender-rolls, &c., great difficulty is experienced and much time wasted in taking out the rolls to remove the worn journals and substitute new ones for them. In practice these journals wear quite rapidly and have frequently to be renewed.
In accordance with my invention I have provided the roll with clamping mechanism at its ends to clamp in an adjustable manner short journals, there being a separate journal at each end of the roll, these journals being held clamped in adjusted position, and by releasing the clamps the journals may be drawn out or pushed into the roll to adapt them to the boxes in which they are to run, or they may be entirely removed and new journals substituted, or the journals may be turned end for end, and I have herein shown the opposite ends of the journals as turned to fit the usual boxes.

Figure 1 in elevation and partial section shows a roll having a journal embodying my invention. Fig. 2 is an end view of the roll with the cap removed. Fig. 3 is a section of the roll in the line $x$, Fig. 1, looking to the right; and Fig. 4 is a detail showing one of the draw-bolts employed to contract or expand the split conical sleeve.

The roll or cylinder shell or case $a$, which in practice will ordinarily be a metal roll, has fixed to it at each end a metal bushing $b$, said bushing being shown only at the left in Fig. 1, the opposite bushings being connected by a shaft $a^x$. Each bushing is of conical shape internally and is grooved longitudinally at 2 2 2 to receive the draw-bolts 3, one of which is shown separately in Fig. 4, the said draw-bolts being of such shape at one end as to be pivoted in the said bushing. As illustrated in the present embodiment of my invention, the said draw-bolt has a T-shaped head to enter an annular groove 7, intersecting the end of the grooves 2. The journal $c$ which I prefer to use will extend but partially through the length of the roll and will have its opposite ends reduced, as at $c'$ $c^2$, to fit the usual boxes, thereby enabling me to reverse the short journal and use its unworn end after one end has become unfitted for use. The journal referred to is placed within a conical sleeve $d$, and is connected thereto loosely by a spline $d'$, the said sleeve being represented as split at 4. The sleeve $d$ has a flanged head $d^2$, out through which are extended the ends of the draw-bolts 3, they receiving nuts 5 upon their outer screw-threaded ends, rotation of the said nuts upon the said draw-bolts in one direction forcing the said conical sleeve into the conical seat in the bushing $b'$, thus effecting the contraction of the said conical sleeve, split as described, causing it to firmly clamp and hold the journal immovably.

When it is desired to move the conical sleeve outwardly so as to unclamp the journal sufficiently to enable it to be moved longitudinally or to be adjusted to extend more or less from the end of the roll to properly fit the box which is to support the journal, then the operator will rotate a series of screws, as $e$, which are screwed through the flange $d^2$ and bear against a shoulder, as 6, in the bushing $b$, the nuts 5 being previously turned on the draw-bolts to cause them to be moved toward the outer ends thereof far enough to provide for this outward movement of the conical sleeve for a distance sufficient to unclamp the journal. Either end $c^2$ or $c'$ of the journal may be used outermost.

By providing the rolls with adjustable journals, which may be readily clamped or unclamped, very much time is saved when a new journal is to be applied for a worn one, and, what is also of great importance, such a journal may be readily adjusted longitudinally with relation to the roll to adapt new rolls to old machines, which frequently vary as to the distance between the boxes which are to support the ends of the journals.

I have provided the rolls at their ends with caps $f$, which are secured by suitable set-screws $g$ to the journals $c$, the said caps being hollow to cover the said screws $e$ and nuts 5 to prevent them from catching upon any material during the rotation of the roll, such caps making a finish for the ends of the rolls.

The shaft $a^×$ employed to connect the bushings $b$ at opposite ends of the roll is herein shown as tubular and as screwed into a threaded portion of the bushing; but I do not desire to limit my invention to the exact form of shaft shown so long as it serves to connect the said bushings. The shaft $a^×$ aids in stiffening the roll, as frequently the roll is composed of a rather thin copper or brass tube.

I claim—

1. The roll $a$ and independent longitudinally-movable journals $c$ at each end thereof, each journal having its opposite ends shaped to fit a box, combined with clamping means to hold the said journals in any desired position, substantially as described.

2. The roll $a$, having the bushing provided with longitudinal grooves, and an annular groove intersecting the ends thereof and the clamping-sleeve, combined with the journal and with draw-bolts held in said longitudinal grooves, the annular groove receiving the heads of the bolts, to operate substantially as described.

3. The roll $a$, having the bushing $b$, the clamping-sleeve therein, the journal $c$, and the cap $f$, secured thereto to completely cover and protect the end of the roll, substantially as described.

4. The roll $a$, the bushing $b$ therein, and clamping-sleeve and draw-bolts, combined with the reversible journal clamped by the said clamping-sleeve and adjustable therein, substantially as described.

5. The roll composed of a metal sleeve, bushings $b$ at each end thereof, a shaft to connect the said bushings, and journals for the ends of the said roll, combined with means to clamp and hold in an adjustable manner one of the said journals, substantially as described.

6. The combination, with the journal $c$, of a bushing $b$, carrying the roll or cylindrical shell or case and having a conical interior, a clamping-sleeve therein, and draw-bolts, to operate substantially as described.

In testimony whereof I have signed my name to this specification in the presence of two subscribing witnesses.

JASON KIDDER.

Witnesses:
GEO. W. GREGORY,
B. DEWAR.